US008319728B2

(12) United States Patent
Geffin et al.

(10) Patent No.: US 8,319,728 B2
(45) Date of Patent: Nov. 27, 2012

(54) INPUT-DEVICE MOVEMENT TO CURSOR MOVEMENT CORRELATOR

(75) Inventors: Steven Geffin, N. Miami Beach, FL (US); Craig Siegman, Pembroke Pines, FL (US); Brian Stewart, Tamarac, FL (US); John Reed, Concord, NC (US)

(73) Assignee: Avocent Huntsville Corporation, Huntsville, AL (US)

( * ) Notice: Subject to any disclaimer, the term of this patent is extended or adjusted under 35 U.S.C. 154(b) by 1032 days.

(21) Appl. No.: 11/250,406

(22) Filed: Oct. 17, 2005

(65) Prior Publication Data

US 2007/0085825 A1  Apr. 19, 2007

(51) Int. Cl.
*G06F 3/033* (2006.01)

(52) U.S. Cl. ............. 345/157; 710/1; 345/2.1; 715/733; 709/203

(58) Field of Classification Search .......... 345/856–862, 345/156–184, 1.1–3.4; 715/733–747, 856–862; 710/1–74; 725/37–61; 709/223, 203
See application file for complete search history.

(56) References Cited

U.S. PATENT DOCUMENTS

| | | | |
|---|---|---|---|
| 5,410,681 A | 4/1995 | Jessen et al. | |
| 5,596,347 A * | 1/1997 | Robertson et al. | 715/856 |
| 5,654,726 A * | 8/1997 | Mima et al. | 345/2.2 |
| 5,786,805 A * | 7/1998 | Barry | 345/159 |
| 6,343,260 B1 | 1/2002 | Chew | |
| 6,392,675 B1 * | 5/2002 | Becker et al. | 715/858 |
| 6,829,726 B1 | 12/2004 | Korhonen | |
| 6,889,365 B2 * | 5/2005 | Okahara et al. | 715/858 |
| 6,904,389 B2 | 6/2005 | Hornberger et al. | |
| 7,155,653 B2 | 12/2006 | Monnerat | |
| 7,162,407 B2 | 1/2007 | Poley et al. | |
| 2003/0016252 A1 * | 1/2003 | Noy et al. | 345/856 |
| 2003/0135656 A1 * | 7/2003 | Schneider et al. | 709/250 |
| 2004/0160967 A1 | 8/2004 | Fujita et al. | |
| 2004/0189598 A1 * | 9/2004 | Fujita et al. | 345/156 |
| 2005/0007344 A1 * | 1/2005 | Cook et al. | 345/163 |
| 2007/0033265 A1 | 2/2007 | Anderson et al. | |

OTHER PUBLICATIONS

"Pointer Ballistics for Windows XP", updated Oct. 31, 2002, found at http://www.microsoft.com/whdc/device/input/pointer-bal.mspx, 5 pages.
International Search Report and Written Opinion mailed Sep. 25, 2007 in international application No. PCT/US2006/021181.
U.S. Appl. No. 10/792,286—May 27, 2009 PTO Office Action.
U.S. Appl. No. 10/792,286—Feb. 18, 2010 PTO Office Action.

(Continued)

*Primary Examiner* — Liliana Cerullo
(74) *Attorney, Agent, or Firm* — Davidson Berquist Jackson & Gowdey, LLP

(57) ABSTRACT

A method and system to detect a correlation of movements of an input device, sent from a first location, with at least one configurable movement parameter set on a remote computer at a second location remote from the first location, wherein the method includes: (a) sending first movement information from the first location to the remote computer at the second location, the first movement information corresponding to a first movement of the input device; (b) tracking a resulting movement of a cursor of the remote computer at the second location in response to the remote computer having received the first movement information and utilized the at least one configurable movement parameter; (c) calculating predicted movements utilizing at least two possible values for the at least one configurable movement parameter; and (d) determining which of the at least two possible values provides the predicted movement most closely matching the resulting movement of the cursor.

21 Claims, 7 Drawing Sheets

OTHER PUBLICATIONS

U.S. Appl. No. 10/792,286—Aug. 3, 2010 PTO Office Action.
CA Appln. No. 2,626,233—Feb. 17, 2012 CIPO Office Action.
IL Appln. No. 190922 Oct. 9, 2011 Israeli Patent Office Action (with English Translation).
U.S. Appl. No. 10/792,284—Jan. 6, 2012 PTO Office Action.
U.S. Appl. No. 10/792,284—Jun. 22, 2009 PTO Office Action.
U.S. Appl. No, 10/792,284—Apr. 14, 2010 PTO Office Action.
U.S. Appl. No. 10/792,284—Apr. 13, 2011 PTO Office Action.
U.S. Appl. No. 10/792,285—Nov. 13, 2007 PTO Office Action.
U.S. Appl. No. 10/792,285—Jul. 17, 2008 PTO Office Action.

* cited by examiner

INPUT-DEVICE MOVEMENT TO CURSOR MOVEMENT CORRELATOR

BACKGROUND OF THE INVENTION

1. Field of the Invention

The present invention relates to a method and system for correlating the movement of an input device at a first location with the movement of a cursor of a remote computer at a second location, remote from the first location, and, in one embodiment, to the correlation of the virtual movement of a mouse device at a keyboard, video and mouse (KVM) switch with at least one acceleration setting associated with the remote computer.

2. Discussion of the Background

FIG. 1 illustrates a known configuration for a digital keyboard, video and mouse (KVM) switch 100, such as a DSR 1020, 2020, 4020 or 8020 available from Avocent Corp., the assignee of the present application. The KVM switch 100 is illustratively connected to a computer 110 (e.g., a blade server) in a rack housing 120 via a communications medium 130, such as at least one CAT-5 cable. The KVM switch 100 may alternatively be coupled to a stand-alone computer (not shown) using the same type of communications medium 130. A user, such as a system administrator, can control the computer 110 utilizing a series of human interfaces.

The first interface that can control the computer 110 is a direct-link keyboard/video/mouse configuration 140 that is directly connected to corresponding keyboard, video and mouse ports (see FIG. 2) of the KVM switch 100. In order to use the first interface, the user is typically within normal cable lengths of the KVM switch 100. Alternatively, the KVM ports of the KVM switch 100 may alternatively be coupled to another KVM switch as part of a cascade of KVM switches.

The second interface that can control the computer 110 is a control computer 160 that is connected to the KVM switch 100 indirectly via a network 170, such as an Ethernet-based packet switched network. The control computer 160 may also connect to the KVM switch 100 via a telephone network 180 utilizing at least one modem 185. The control computer 160 is a general purpose computer (such as might be running one of the Microsoft Windows™ Operating Systems (e.g., XP, 2000, ME, 98 or 95)) that also includes a control program for interacting with the KVM switch 100. The control program may include the DSView™ family of software (e.g., DSView 2 and DSView 3) available from Avocent Corp. Using such a control program, the user is able to utilize a local input device 190 (e.g., a mouse, a trackball or a tablet) to interact with the video being received from the remote computer 110.

The third interface that can be used to control the computer 110 is a browser-based computer 165 which utilizes a web-browser (e.g., Internet Explorer™ by Microsoft or Mozilla Firefox™). The browser-based computer 165, like the control computer 160, may connect to the KVM switch 100 via either a network 170 or via a telephone network 180 utilizing at least one modem 185.

FIG. 2 illustrates in greater detail the connections of a known KVM switch 100. In the illustrated embodiment, the KVM switch 100 connects a user (e.g., via a direct-link keyboard/video/mouse configuration 140, or at either control computer 160 or browser-based computer 165) to up to thirty-two remote computers 110 via communications media 130 connected to the remote network ports 135. Using a circuit such as a DSRIQ 115, the digital signals (keyboard and mouse) are combined into a single digital protocol for transmission across communications media 130, and the video signals are placed on separate twisted pair wires (one R, G, B signal per wire pair) within a single cable. Commercially available DSRIQs available from Avocent include DSRIQ-PS2, PS2L, -USB, -USB2 and -VSN.

One problem associated with the above-noted configurations is that when a user of the control computer 160 utilizes the input device 190, a cursor that provides the most rapid feedback to the user is the cursor that is generated at the local computer, i.e., at control computer 160. The movement of local cursor, however, may not, and often does not, correspond to how the cursor of the remote computer 110 reacts to the same movements, depending on at least one configurable movement parameter.

Under the Windows™ Operating System, it is possible to establish acceleration parameters that effect how the physical movement of an input device is converted into movement of the cursor on the display. In particular, registry entries (such as "MouseSpeed") can be created and subsequently read that control the acceleration of the mouse as it moves. Table I below illustrates the acceleration parameters that can be set under the Windows 2000 Operating System.

TABLE I

| Acceleration Setting on Mouse Control Panel GUI | MouseSpeed registry entry | MouseThreshold1 registry entry | MouseThreshold2 registry entry |
| --- | --- | --- | --- |
| None | 0 | 0 | 0 |
| Low | 1 | 7 | 0 |
| Medium | 2 | 4 | 12 |
| High | 2 | 4 | 6 |

According to Table I, when the MouseSpeed registry entry is set to a value of zero ("0"), no acceleration modifications are made to mouse movements. This corresponds to the setting normally set when using known KVM switches 100 to avoid the mismatch (or lack of synchronization) between the local cursor movement and the remote cursor movement. However, this setting can be reset by a user that is unfamiliar with the consequences, such that a mismatch occurs. Moreover, a computer 110 to be connected to a KVM switch 100 may be factory set to have a non-zero value set for "MouseSpeed" such that there may be a mismatch even when the computer 110 is first connected to the KVM switch 100.

If acceleration is enabled, then the MouseSpeed registry entry will be non-zero, such as 1 or 2. When the remote computer 110 is set to use Low Acceleration, then the MouseSpeed entry is set to one ("1"). Under that configuration, the MouseThreshold1 and MouseThreshold2 entries are set to 7 and 0, respectively.

Similarly, the MouseSpeed can be set to two ("2") with corresponding values for MouseThreshold1 and MouseThreshold2 in order to enable medium and high acceleration, respectively.

The threshold entries indicate at what level of movement the movement is accelerated. "MouseThreshold2" specifies a mouse speed that triggers accelerated cursor movement. If, within the interval between mouse interrupts, the mouse moves by more than the number of units specified in the value of this entry, the system can accelerate the cursor. When accelerated, the cursor moves more than one unit for each one-unit movement of the mouse. The amount of acceleration depends on the value of MouseSpeed. If the value of MouseSpeed is 1 or 2, cursor speed doubles when the mouse speed reaches MouseThreshold1. If the value of MouseSpeed is 2, cursor speed quadruples when the mouse speed reaches MouseThreshold2.

Under Windows XP, registry entries are identical to Windows 2000 with the addition of a MouseSensitivity entry. If "Enhance Pointer Precision" is checked in the Mouse Control Panel GUI values used for the registry entries are as shown in Table II.

TABLE II

| Enhance Pointer Precision | MouseSpeed registry entry | MouseThreshold1 registry entry | MouseThreshold2 registry entry |
|---|---|---|---|
| Not Checked | 0 | 0 | 0 |
| Checked | 1 | 6 | 10 |

MouseSensitivity is set via the "Pointer Speed" setting on the Mouse Control Panel GUI. If MouseSensitivity is set to a value of zero (the lowest value which can be set through the Mouse Control Panel GUI is one—setting it to zero requires editing or programmatic manipulation of the registry), and "Enhance Pointer Precision" is not checked, then under Windows XP the registry entries cause the cursor to move in a manner identical to Windows 2000. If MouseSensitivity is set to a non-zero value, and if "Enhance Pointer Precision" is not checked, then MouseSensitivity acts as a multiplier on mouse input. When "Enhance Pointer Precision" is checked the cursor moves in a manner as described in Pointer Ballistics for Windows XP, the entire contents of which are incorporated herein by reference and included with the application as filed.

Under Windows NT, the MouseSpeed registry entries are set as described below in Table III.

TABLE III

| Speed Setting on Mouse Control Panel GUI | MouseSpeed registry entry | MouseThreshold1 registry entry | MouseThreshold2 registry entry |
|---|---|---|---|
| Slow (slider fully left) | 0 | 0 | 0 |
| Slider + 1 tick mark from left | 1 | 10 | 0 |
| Slider + 2 tick marks from left | 1 | 7 | 0 |
| Slider + 3 tick marks from left | 1 | 4 | 0 |
| Slider + 4 tick marks from left | 2 | 4 | 12 |
| Slider + 5 tick marks from left | 2 | 4 | 9 |
| Fast (slider fully right) | 2 | 4 | 6 |

Under Linux, the user can set the mouse acceleration through a Linux utility called xset. xset takes two parameters: the acceleration value and the threshold value. With those two settings the mouse moves on a 1:1 basis until the threshold value is reached at which point it then moves by the multiple specified by the acceleration value. By putting the xset command into a file that gets run at startup, such as /etc/rc.local the mouse settings can be set each time Linux is started.

SUMMARY OF THE INVENTION

It is an object of the present invention to detect a correlation of input device movements, sent from a first location, with at least one configurable movement parameter set on a remote computer at a second location remote from the first location, wherein the method includes: (a) sending first movement information from the first location to the remote computer at the second location, the first movement information corresponding to a first movement of the input device; (b) tracking a resulting movement of a cursor of the remote computer at the second location in response to the remote computer having received the first movement information and utilized the at least one configurable movement parameter; (c) calculating predicted movements utilizing at least two possible values for the at least one configurable movement parameter; and (d) determining which of the at least two possible values provides the predicted movement most closely matching the resulting movement of the cursor.

One embodiment of the present invention is achieved by utilizing a KVM switch that generates the first and second movement information, described above, in order to simulate the movement of an input device, such as a mouse. By utilizing the KVM switch to perform the movement, a user does not have to be trained to properly move the mouse in the fashion that enables the configurable movement parameter(s) to be determined.

In yet another embodiment, the control computer executes the software described above as having been run on the KVM switch to determine the value(s) of the configurable movement parameter(s).

In an alternate embodiment, the KVM switch can provide to the user a series of prompts (e.g., audio or visual) that specify how the input device is to be moved, and when, so that the user can move the input device in a fashion that will enable the KVM switch to determine the value(s) of the configurable movement parameter(s).

BRIEF DESCRIPTION OF THE DRAWINGS

The following description, given with respect to the attached drawings, may be better understood with reference to the non-limiting examples of the drawings, wherein.

DISCUSSION OF THE PREFERRED EMBODIMENTS

As described herein, the methodology of the present invention can be divided into two general portions: (1) determining a shape of the cursor on the remote system and (2) determining how that cursor moves under various conditions which are effected by the at least one configurable movement parameter set on the remote computer. In the simplest configuration of the first portion, the user identifies (e.g., from a menu or a series of pictures or via a keyboard selection) the shape of a cursor where the cursor on the remote machine is known a priori to be one of the shapes presented to or selectable by the user. Alternatively, a user may identify the cursor (e.g., by drawing a square, circle or other shape around it) so that the shape of the cursor need not be known a priori.

Figure 1:
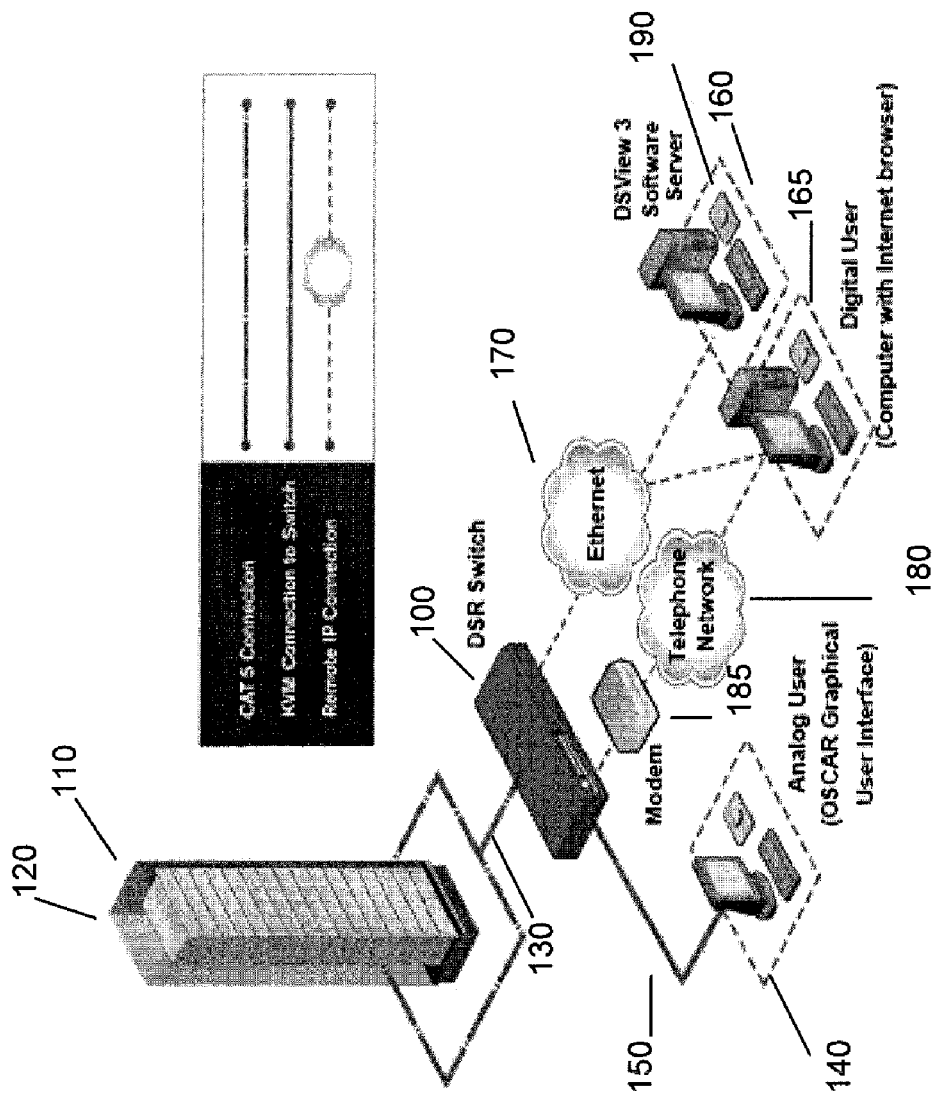
FIG. 1 is a high-level diagram representing a known configuration for using a keyboard/video/mouse (KVM) switch.
Figure 2:
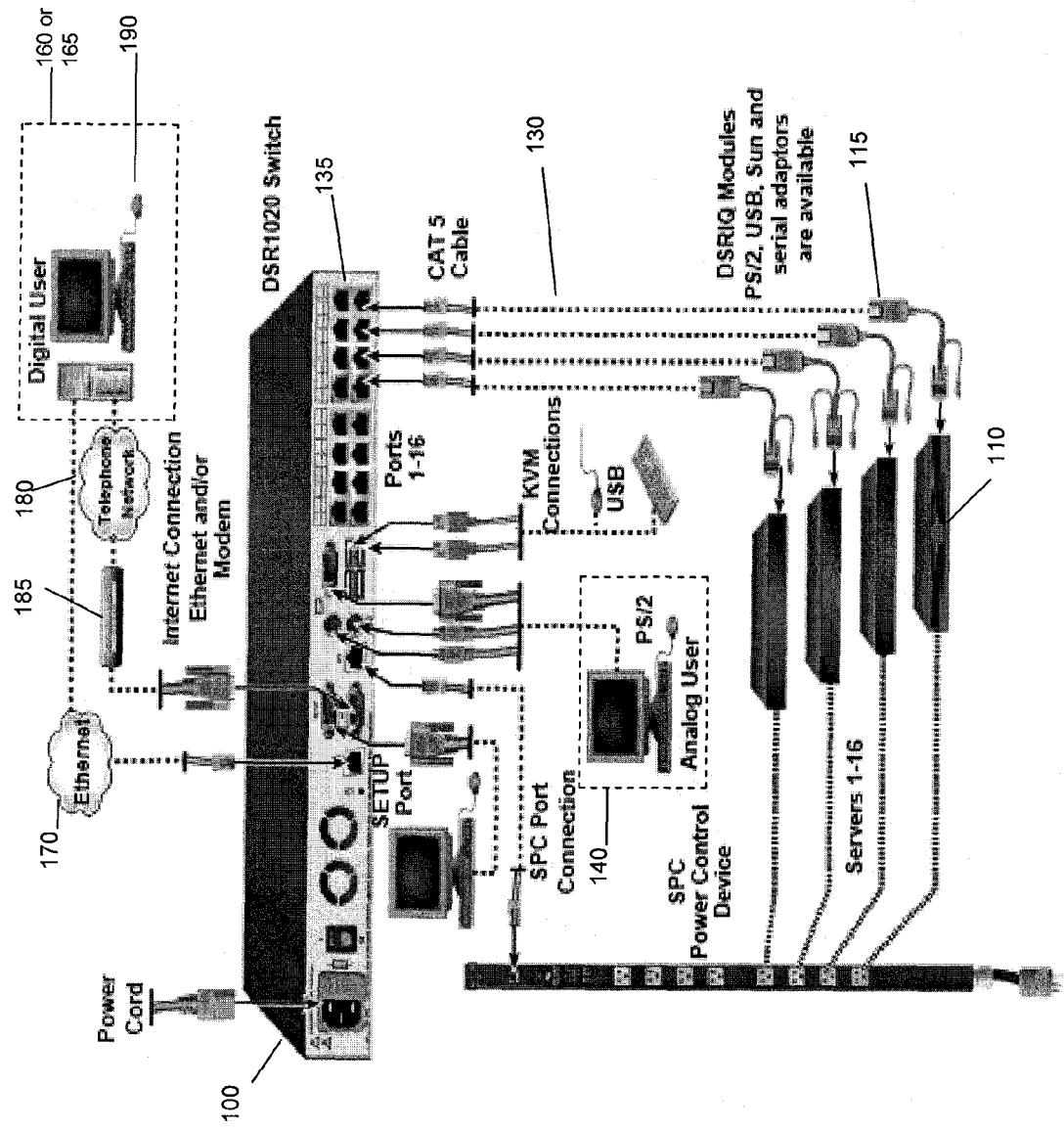
FIG. 2 is a connection-level diagram representing various connections of a known KVM switch.
Figure 3:
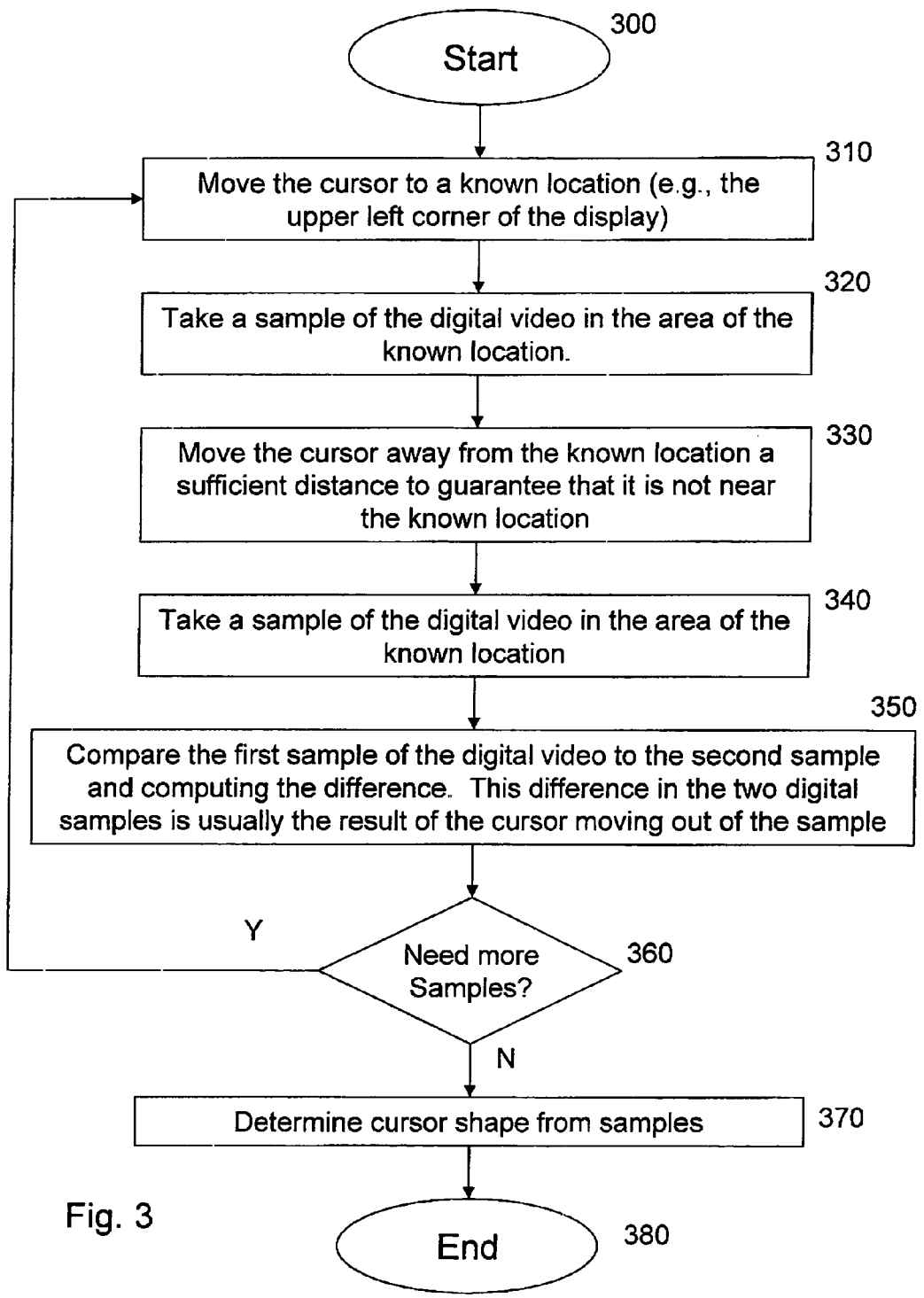
FIG. 3 is a flowchart showing a method of detecting a cursor shape as part of the present invention which may be incorporated into and performed by the KVM switches of FIGS. 1 and 2 or which may be incorporated into and performed by computers connected to the KVM switches of FIGS. 1 and 2.

In a more complicated configuration of the first portion, the shape of the cursor is automatically determined, e.g., as shown in FIG. 3. In the implementation of FIG. 3, the shape of the cursor is determined by a procedure starting with step 300 and ending with step 380. When control passes to step 310, the cursor of the input device (e.g., a mouse, a trackball, a graphics tablet or similar device) is moved to a known location. Such a location may be selected a priori (e.g., it is always the upper left-hand corner of the display), or it may be determined at run-time (e.g., by determining a seemingly least obstructed or cluttered area). In the case of determining the location at run-time, a location that appears most like a solid color or other background image is selected by capturing and storing a frame of video and processing the frame. One such method would be to determine a region with the smallest variation.

It may be preferable to select a corner region as the variation between the position of the local cursor and the remote cursor may be reduced in the corners since the remote computer typically will not allow the cursor to move beyond the corners. If the region to which the cursor is to be moved is not at an extremity, then the cursor may be moved to the designated position in a fashion (e.g., slowly enough) that the configurable movement parameter does not effect the movement of the cursor. This may or may not require first moving the local and remote cursors to a known extremity to synchronize them and then moving the cursors towards the known location.

Once the cursor has been moved to the known location, control then passes to step 320, where a sample of video is stored for an initial area surrounding the known location. Control then passes to step 330 where the cursor is moved out of the initial area stored for the video sampling step of step 320. Control then passes to step 340 where the video image of the initial area is again stored, this time without the cursor being within the initial area. Step 350 then calculates the difference between the two images, e.g., by performing a subtraction or an exclusive-OR of the two images and determining where the image has changed.

As would be appreciated by one of ordinary skill in the art, steps 310 to 340 can be reversed such that the video is first stored while the cursor is kept out of the initial area and then video of the initial area is subsequently stored after the cursor has been moved to the known location. Step 350 which calculates the difference between the two stored images would still obtain the shape of the cursor by reversing the order that the difference is calculated in or by reversing the result of the difference calculation. As would also be evident to one of ordinary skill in the art, an entire video frame may be stored in steps 320 and 340 but the difference between the two stored images need only be processed in the portion of the frame corresponding to the initial area (i.e., the area where the cursor is moved in and out or out and in).

Control then passes to step 360. If the method is configured to try to obtain the shape of the cursor in a single execution of steps 310 to 350, then the number of samples necessary is selected to be one and control passes from step 360 to step 370. However, if the number of samples to be obtained is more than one, then control would pass from step 360 to step 310 so that the process of steps 310 to 350 can be repeated.

Once a sufficient number of samples have been taken, step 360 passes control to step 370 where the shape of the cursor is determined. In one embodiment, the shapes of the differences determined by step 350 may be compared against a series of known cursor shapes, and if a high enough correlation exists, the shape of the cursor will be selected as being one of the predefined shapes. In an alternate embodiment, the shapes of the differences are averaged to produce an image (e.g., a bitmap) of the predicted shape of the cursor, such as when the cursor is a non-standard cursor. However, in all cases, after a cursor shape has been determined or selected, the cursor shape selection process ends with step 380.

As would be appreciated by one of ordinary skill in the art, the initial area for which the video is stored or where the stored frame is processed need not be the same for each iteration of steps 320-340. For example, the initial location may be the upper left-hand corner for the first iteratigon of steps 320-340, and then it may be the lower right-hand corner for the second iteration of steps 320-340.

Figure 4:
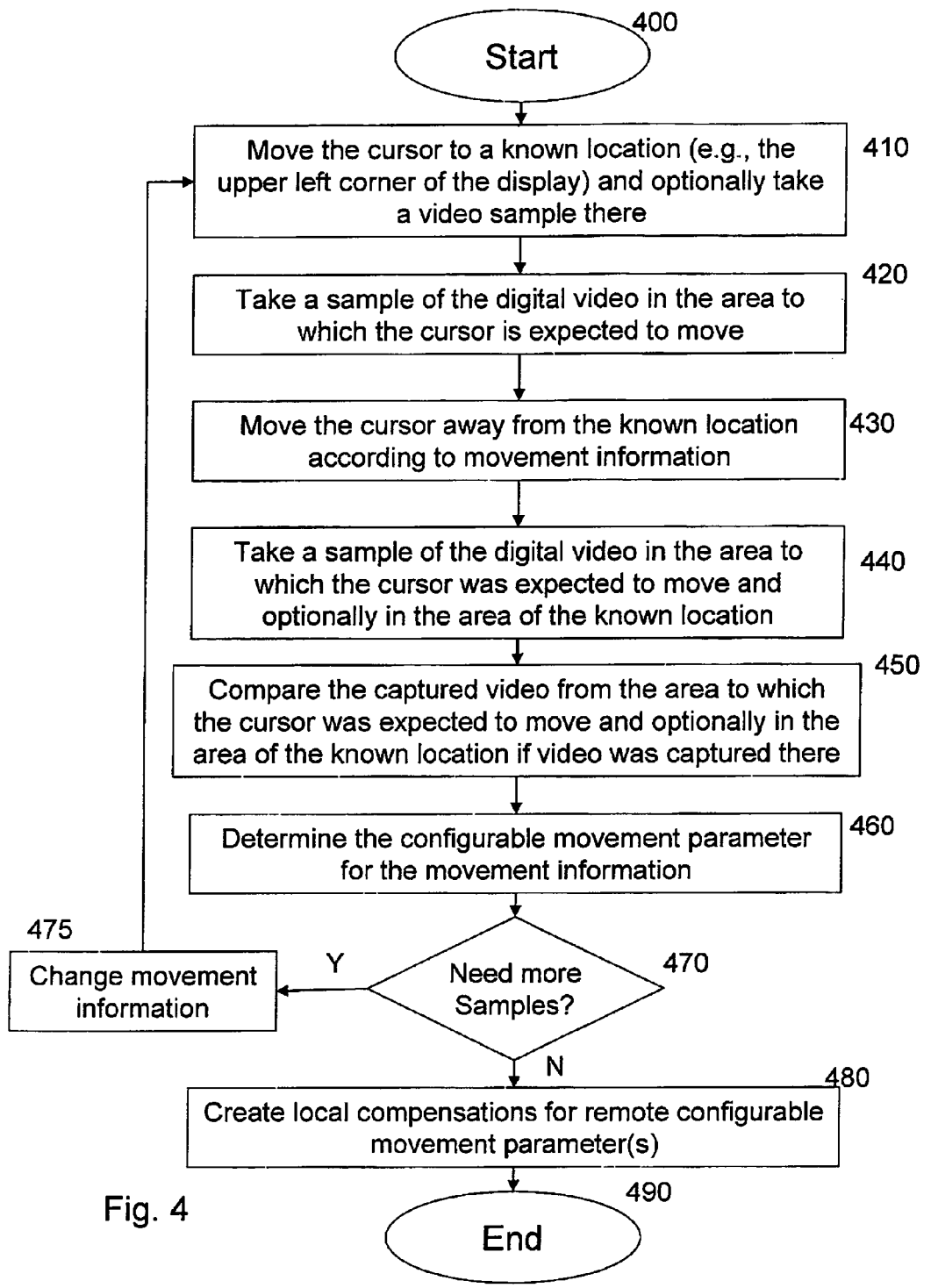
FIG. 4 is a flowchart showing a method of detecting a correlation between movement of an input device and at least configurable movement parameter set on a remote computer according to the present invention.

Using the result of step 380, the process of determining the correlation with the configurable movement parameter then continues with FIG. 4. The process starts with step 400 and ends with step 490. When control passes to step 410, the cursor is moved to a known location (again, either selected a priori or at run time). The video around the initial cursor position optionally may be stored as well, e.g., in order to verify that the cursor has actually moved out as expected. However, as noted, it is optional. In step 420, a sample of the video in the area to which the cursor is expected to move is stored. As would be appreciated by one of ordinary skill in the art, the order of the video storing of steps 410 and 420 may be reversed without departing from the scope of the invention. In step 430, the cursor is then moved from its initial position according to movement information (either physical or virtual as described in greater detail below). In step 440, video is stored from the area in which the cursor is expected to move and is optionally stored from the initial area.

In step 450, the stored video from steps 420 and 440 are examined to determine to where the cursor actually moved according to the movement information. In one implementation of this step, the movement information is applied to each of a series of possible values to determine a series of predicted locations. The stored video is then compared to see to which of the predicted locations the cursor appears to have gone. This is done by removing the portions of the stored image(s) that have not changed and pattern matching with the shape of the cursor obtained in step 380. Based on the results of the comparison(s), the configurable movement parameter is determined in step 460.

In step 470, it is determined if more samples are needed. If so, control passes to step 475. If more samples are not needed, control passes to step 480. More than one sample may be needed in cases where the configurable movement parameter depends on multiple conditions or movements. More than one sample may also be necessary when there are multiple configurable movement conditions, e.g., an x-axis acceleration parameter and a y-axis acceleration parameter. Similarly, more than one sample may be necessary when one wishes to use a statistically significant number of samples to reduce the likelihood of making an incorrect correlation.

As would be appreciated by one of ordinary skill in the art, the movement information need not be a single movement, e.g., from point A to point B, but instead may be a series of movements that take a known (relative or absolute) path but which are sufficient to distinguish one potential value of the at least one configurable movement parameter from another. Moreover, the movement information may also include timing information about how long one or more movements along a path must take or in how many increments the movements must be made. For example, the present invention may utilize movement information which describes a path including: a series of slow moving small movements followed by a series of faster moving movements of greater size and last followed by a series of even faster movements of even greater size.

In one such case, with reference to Table I above, with one movement of eight units it is possible to tell if no acceleration is turned on or if low acceleration is turned on (if those are the only possible values). In the case of no acceleration, the remote cursor would have moved eight units in response to the local eight unit move. However, in the case of low acceleration, the remote cursor would have moved sixteen units in response to the local eight unit move. Thus, by determining whether the movement was closer to eight or sixteen, the present invention can select the more appropriate configurable movement parameter.

If more than just "none" and "low" accelerations are possible, then additional movements may be necessary to distinguish between the other possible values also. For example, by moving the cursor at least four units and less than six units, it can be determined if medium or high acceleration is on by seeing if the remote cursor's move is double the local cursor's move. If not, then the local cursor can be moved eight units at that point to see if low or no acceleration is turned on. If the 4 or 5 unit move reveals that medium or high acceleration is turned on, then the cursor can be moved six or more units but less than 12 units to see if the movement quadruples. If so, then "high" acceleration is turned on; otherwise "medium" acceleration is turned on.

Once the acceleration rate of the cursor on the remote computer is known, any time the cursor on the local computer is moved the amount it was moved will be programmatically modified to compensate for the acceleration that will occur on the target system. Movements of 1 unit are typically not accelerated since that would preclude fine movements, so multiple movements of 1 unit timed to the target's known update rate can be done. Unfortunately, the update rate at which commands can be sent to the target is relatively slow so 1 unit movements should not be continuously used, unless update rate command speed processing can be improved.

The method and system of the present invention receive movement information and, using the determined at least one configurable movement parameter, convert the movement information into a set of one or more substituted movements, potentially each with its own characteristic such that the position of the cursor on the remote system matches the position of the cursor on the local system. For example, if the input device moves 35 units on the local system and the mouse acceleration thresholds (i.e., characteristics) are set to MouseThreshold1=4 and MouseThreshold2=6, then the present invention would send a movement of 8, which would be quadrupled because it exceeds MouseThreshold2, and another movement of 3, which would not be doubled or quadrupled because it does not exceed either of the thresholds (characteristics). Together the two movements would produce a movement on the remote computer of 8*4+3=35 which is the same as the original movement, and thus the two mouse cursors stay in synchronization. Generally, when applicable, the system and method receive a single movement and convert the movement into plural movements which are sent to the remote computer, wherein at least two of the plural movements will be modified on the remote computer using different translations.

Since the cursor on the local computer is moved a known amount, and the cursor on the remote system is moved the same amount through the use of the programmatic modification of the cursor movement amounts, then the two cursors (local and remote) will stay synchronized. By staying synchronized the user may move the cursor on the local computer and have confidence that the cursor on the remote system will be moved to the exact same location. (The local computer may still have to ensure that input device movements are only translated and sent to the remote computer when the cursor movement is actually within the local computer's image of the remote computer. For example, if the local computer is able to show the remote computer's video image in a window that takes up less than the full screen of the local computer, then only those movements within the window are translated and sent to the remote computer. However, this can be done by determining when the cursor on the local computer enters and leaves the window corresponding to the image of the remote computer.)

Figure 5:
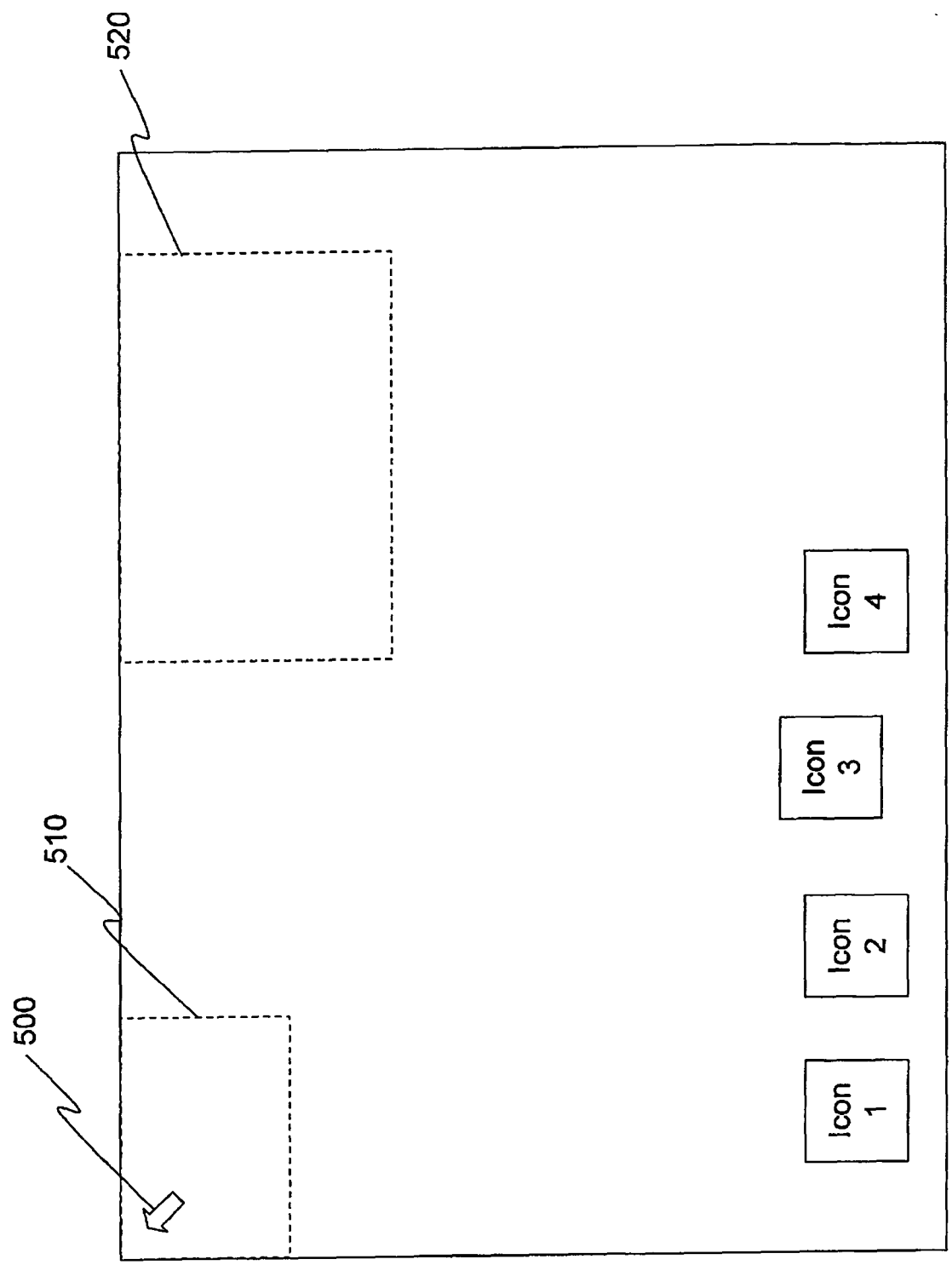
FIG. 5 is a simulated screenshot showing a cursor in an initial area of a remote desktop with a second area designated as the area to which the cursor will ultimately be moved.
Figure 6:
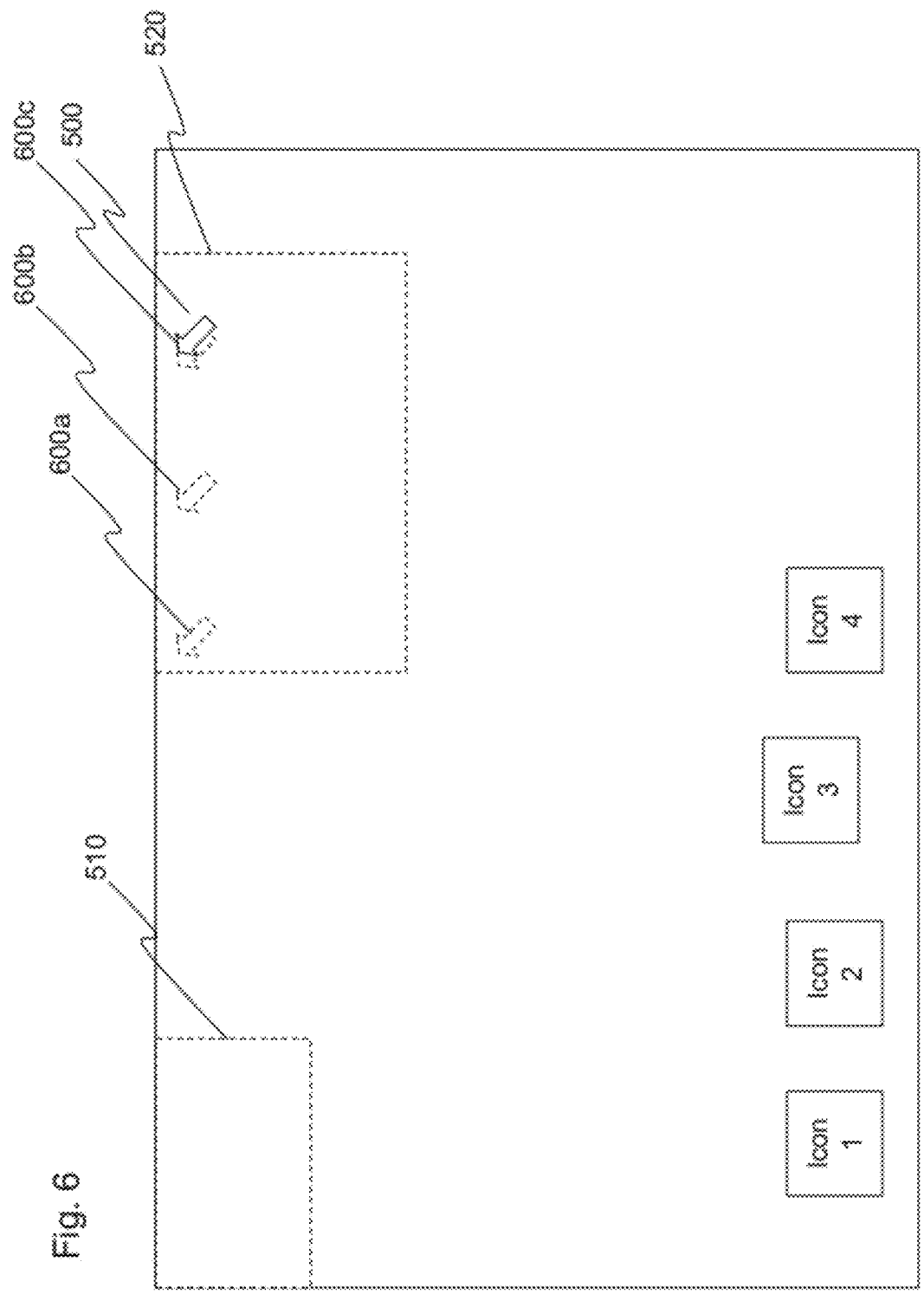
FIG. 6 is a simulated screenshot showing the remote desktop of FIG. 5 after the cursor has been moved according to the invention and with three predicted locations for the cursor according to three different predicted values for the at least one configurable movement parameter(s)

Turning to FIGS. 5 and 6, two simulated screenshots illustrate the process of FIG. 4 at a high-level. FIGS. 5 and 6 assume that the method of FIG. 3 detected that the shape of the cursor on the remote computer 110 is an arrow. The cursor 500 is then moved to a known location or initial region 510, illustrated as the upper left-hand corner of the screen. FIG. 5 further illustrates that the size of the initial region 510 in which the cursor 500 starts need not be the same size (or shape) as the final region 520 in which the cursor 500 ends up. As can also be seen, there are locations on the remote desktop that include icons (illustrated as icons 1-4) which could make poorer candidates for the initial region 510 or final region 520. Thus, the present invention may elect to avoid those regions, by either automatic avoidance or via manual selection.

FIG. 6 illustrates how the method of the present invention moves the cursor 500 from the initial region 510 to the final region 520. FIG. 6 also illustrates three predicted values for the final location of the cursor, depending on three possible values for the configurable movement parameter(s). By using graphical pattern matching, the present invention detects that predicted cursors 600 $a$ and 600 $b$ at their respective locations are not as good as predicted cursor 600 $c$ at its location since predicted cursor 600 $c$ is the closest to the actual final location of cursor 500. While the illustrated example shows movement of the cursor in only a single direction, the present invention also includes movement in multiple directions.

As can be seen from FIG. 6, it is possible that none of the predicted cursors 600 $a$-600 $c$ actually align exactly with the cursor 500 in the final region 520. In such a case, the present invention further includes performing fine adjustments to determine if there is a predicted cursor that is close to the predicted locations. In an implementation of one such method, variations of each of the locations are selected (e.g., in either increasing or decreasing distances from the originally predicted positions) and comparisons are made to determine if the cursor 500 is located at one of these adjusted positions. For example, if one of the predicted positions was (600, 50), then the fine adjustment procedure may check at (600, 50)±(i,i) for increasing values of "i". Starting at i=1, those positions would include (599, 49), (599, 50), (599, 51), (600, 49), (600, 51), (601, 49), (601, 50), (601, 51). If ±(i,i) for i=1 failed to find a cursor match at any of the originally predicted locations, then the value of "i" would be reset to i=2 and the calculations repeated. The value of "i" would be increased up to a threshold at which point the system may determine that it does not know how to compensate for the change.

Alternatively, instead of staying within the final region 520, the present invention, upon not finding the cursor 500 near any of the predicted locations, can additionally begin a comparison in a larger, modified final region (not shown) or even for every pixel of the stored image. The present invention alternatively can also ask the user to identify where the cursor is.

It is also possible that due to sampling errors when the image was created the cursor 500 is not exactly the same shape as the determined cursor from FIG. 3. In such a case, to avoid a detection failure, the present invention may utilize a confidence value that represents how much of the cursor must match before a predicted cursor 600 can be declared a match for the actual cursor 500. Such a confidence level can be set to values such as 95%, 90% or 85% and may depend on the noise in the video acquisition process.

In yet another embodiment of the present invention, the actual shape of the cursor is not utilized. Rather the system and method of the present invention simply track locations where there are changes in small areas. If it is determined that changes before and after the cursor movement correspond to possible predicted movements, then the method and/or system or the user may determine that a match exists for the at least one configurable movement parameter.

When detecting initial and final regions 510 and 520, the present invention may utilize plural frames of stored video to detect candidate regions in which changes are occurring while there is no movement from the input device. Such changes may be detected by differences between stored frames. Regions with such changes may also be avoided. Alternatively, user input may be requested to identify suitable or unsuitable candidate regions for the initial and final regions 510 and 520.

To ensure that movement of the input device does not interfere with the detection of suitable candidate regions, the system of the present invention may additionally include code or circuitry to block or queue incoming input device commands destined for the remote computer 110 that is currently being configured. Alternatively, the present invention may additionally include code or circuitry to detect when input device movement occurred during the candidate selection and simply discard frames stored during movement. The candidate region selection process could then restart once input device movement stopped.

While described generally above, the present invention can be implemented in a variety of different embodiments. In a first embodiment, the invention is fully or substantially automatic. In this embodiment, the method of determining the correlation between movement corresponding to an input device and a value of at least one configurable movement parameter is performed inside a KVM switch 100. In such an embodiment, one or both of the methods of FIGS. 3 and 4 are performed inside the KVM switch 100.

The method may be executed at any of a number of times. For example, the method for detecting the remote configurable movement parameter may occur the first time that a computer is connected to the KVM switch 100. In such a configuration, the KVM switch 100 is notified that the setting(s) of a new remote computer 110 is/are to be determined. Once the remote computer 110 has booted to its configuration in which the cursor is to be tracked, the KVM switch 100 can begin the process of determining the at least one configurable movement parameter by generating movement information representing virtual input device movement. That is, the KVM switch 100 generates movement information that would be the same as what the input device would generate to move the cursor along the path(s) that is/are desired for step 430 of FIG. 4. The KVM switch 100 may further control the timing of the movements, if necessary, as well as the size of each movement in order to achieve the desired cursor motion. The KVM switch 100 will also generate movement information to move the cursor along multiple paths or at multiple speeds if necessary to determine each of the at least one configurable movement parameters.

The KVM switch 100 may then store the value of the determined parameter in the memory (see 720 of FIG. 7) of the KVM switch 100 so that the determination process need not be repeated when the user switches the KVM switch 100 to another remote computer (not shown) and then back to the remote computer 110 for which the parameter(s) was/were already determined.

In one implementation of such a method being performed by a KVM switch 100, the KVM switch 100 freezes or blanks the video displayed to the user so that the user is not confused to see the cursor of the input device moving without the user actually moving the input device. In such an embodiment, the KVM switch 100 may also (1) display a message to the user that identifies the ongoing process and/or (2) disable or queue further input from the input device until the determination process is complete. Alternatively, the user may see the ongoing process, optionally with a message overlaid over the original video. Again the input from the input device may be disabled or queued.

Given that a user may select to reconfigure the at least one movement parameter after the value of the parameter has been stored in the memory of the KVM switch 100, the method of the present invention may be re-run subsequently to determine a new value of the parameter. The re-running may be triggered through the use of a hot-key, a menu item, a selectable mouse movement pattern, a stand-alone program or any other means by which a command may be sent to the KVM switch 100 which would re-initiate the determination process. In yet further embodiments, the determination process may be run each time that the KVM switch 100 switches to display a video output of a remote computer 110 or periodically (e.g., once a day when the KVM switch 100 first switches to the remote computer 110 for the day/period or at other times triggered by a timer (see 710 of FIG. 7)).

The present invention may also include the ability to specify, e.g., via an on-screen display, what type of computer the remote computer 110 is such that the configurable movement parameter will be (initially) assumed to be the same for all such computers of that type. Alternatively, the type of operating system of the remote computer 110 may be specified so that the system does not bother using predicted values which are incompatible or unsupported by the remote computer 110.

Alternatively, the identity of each remote computer 110 may be provided to the KVM switch 100 such that the KVM switch 100 can query a remote information source (e.g., a database) which contains the current or last known value of the configurable movement parameter. Such an embodiment may be especially helpful in disaster recovery environments so that the determined values can be quickly recovered in case of a failure of the KVM switch 100. In such an embodiment, the KVM switch 100 would also store the value of the configurable movement parameter(s) in the remote database after they are determined.

Figure 7:
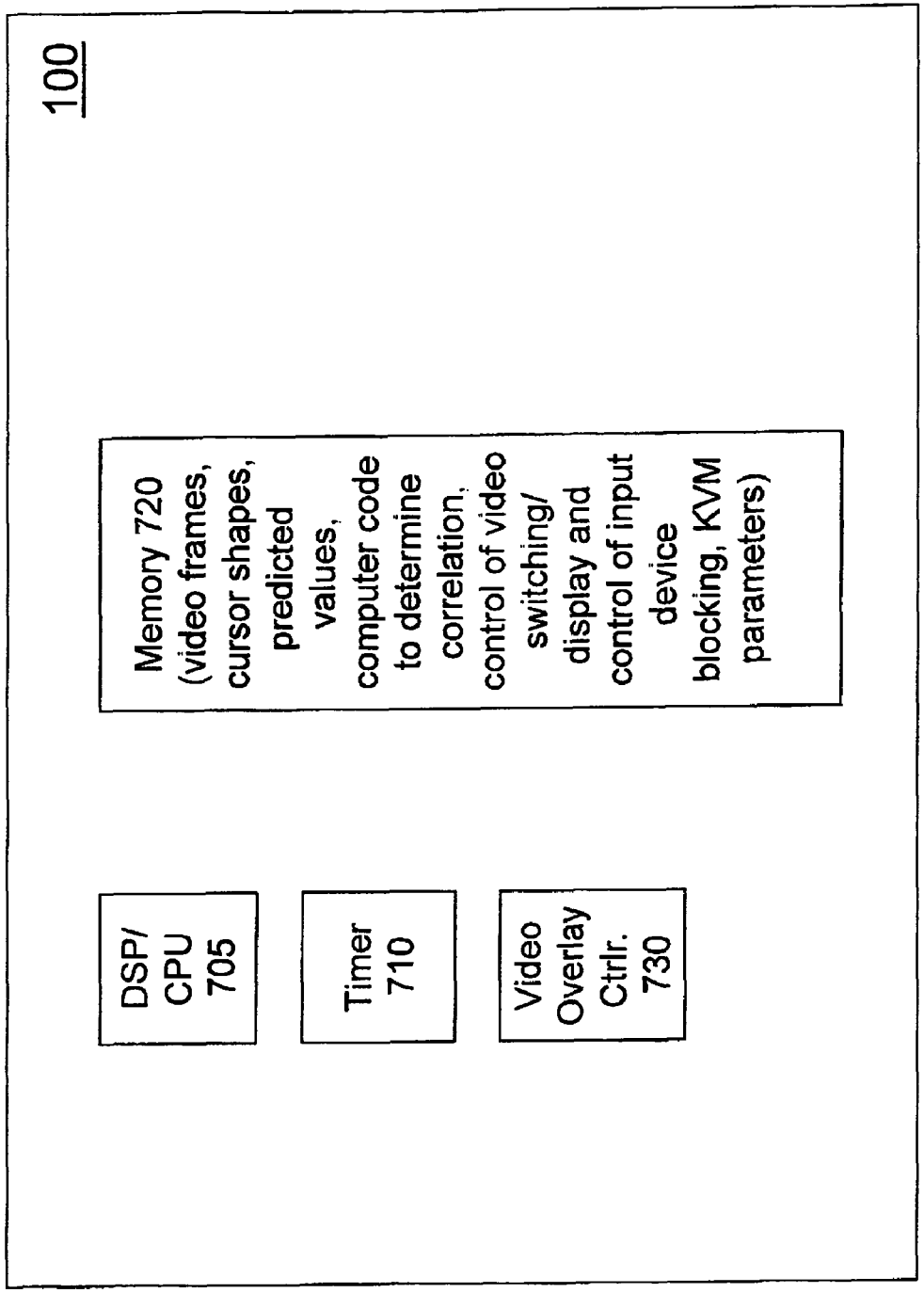
FIG. 7 is a block diagram of an illustrative embodiment of a KVM switch according to the present invention.

FIG. 7 illustrates an exemplary which has been modified to include computer code and/or circuitry for implementing the method of the present invention. The KVM switch 100 includes a DSP/CPU 705 for performing the calculations of the method described above. The DSP/CPU 705 may be either a DSP, or a CPU or both, and may be either dedicated to the correlation calculation or shared with other functions that need to be performed inside the KVM switch 100, such as controlling the functions normally found within the DSR family (e.g., DSR 1020, 2020, 4020 and 8020) of products. The illustrated KVM switch 100 further includes a timer for periodically triggering the correlation process when the KVM switch 100 is so configured. It also includes a memory 720 for holding received video frames, cursor shapes (both predicted as well as a library of known shapes), predicted values, KVM configuration values (e.g., the names of remote computers and their determined configurable movement parameters, if known) and computer code. The computer code may include, but is not limited to, code to determine the cursor shape, code to perform the correlation (including code to autonomously generate the movement information), code to control switching of video and/or display depending on what, if anything, a user is to see during a correlation or cursor determination process. The memory 720 may also include code to block or queue input from the input device as described above. The illustrated KVM switch 100 may further include a video overlay circuit 730 if such a circuit is needed to generate overlaid video.

In yet a further embodiment, the KVM switch 100 performs configuration of the remote computer 110 while the user is interacting with a second remote computer (not shown). That is, the KVM switch 100 is autonomously performing the correlation of the present invention, including generating and transmitting movement information to a first computer and receiving back video from the first computer, while simultaneously sending to the user video from a second computer.

In an alterative configuration for the present invention, at least a portion of the above-described functionality is moved from being implemented on the KVM switch 100 to being implemented on the local computer. In one such configuration, the control computer 160 identifies to the KVM switch 100 which regions the KVM switch 100 should use for initial and final regions 510 and 520. Alternatively, the control computer 160 identifies to the KVM switch 100 what the shape of the cursor is such that the KVM switch 100 does not have to perform that calculation.

In yet another embodiment, the video from remote computer 110 is received by and analyzed by the control computer 160 to determine the changes in the video as a result of the virtual or simulated movements of the input device under the control of the KVM switch 100. In a further embodiment of the present invention, the control computer 160 is configured to send to the remote computer 110 the movement information representing movements along the path(s) necessary to determine the at least one configurable movement parameter.

In a more user-centric embodiment, the above-described software or circuitry of the control computer 160 used to generate the movement information is replaced with software or circuitry to prompt the user to perform the movements of the cursor as necessary to determine the at least one configurable movement parameter. Such prompts may be audio or visual or both. For example, the software of control computer 160 can display a starting location and an ending location between which the cursor should be moved. In such a configuration, the software or circuitry can verify that the local cursor is moved as instructed and/or as necessary and may restart the movement process if not.

In another user-centric embodiment, the present invention may avoid the use of graphical pattern matching and replace it with user input. In such an embodiment, a screen such as shown in FIG. 6 is presented to the user after the movement information (generated by any one of the KVM switch 100, the control computer 160 or the user) is sent to the remote computer 110. After being presented with such a screen showing each of the predicted cursor locations, the user would identify to the KVM switch 100 or the control computer 160 which of the predicted cursor positions was the closest, and the predicted value(s) used to generate that closest position would be stored as the configurable movement parameter. Such a user-based feedback process can be repeated a number of times to obtain further refinements or to make sure the proper value is selected.

In another user-centric embodiment, the present invention may provide direct control over which of the possible values is expected to be the configurable movement parameter. In such an embodiment, the user informs the KVM switch 100 or the control computer 160 which of the candidate values to use, and the KVM switch 100 or the control computer 160 begins providing the correction associated with that candidate value. As the user moves the cursor around, the user can determine if the local and remote cursors are losing synchronization. If so, the user can elect to use a different candidate value. The system (i.e., KVM switch 100 or the control computer 160) or the user would then resynchronize the local and remote cursors (e.g., by moving them both to a known location), and then the system would begin providing the correction associated with that new candidate value. The user could repeat this process until he/she had selected the candidate value which provided the best synchronization.

The above description has been provided based on the assumption that the configurable movement parameters to be selected from were known a priori. However, future versions of operating systems may provide alternate values for the parameters of Tables I-III above. As a result, the KVM switch 100 and the control computer 160 may be equipped with the ability to receive updates of those tables, either from local or remote sources. Moreover, their software may be created to include the ability to "fine tune" parameters in the tables or create new table entries. In such an embodiment, the user interface to the system (i.e., KVM switch 100 or the control computer 160) would include menus or hot-keys to (1) select which of the various entries in the tables are to be updated and (2) adjust (e.g., increment or decrement) the values in the selected entries such that the new or updated entries can be used as predicted values.

In at least one embodiment of the present invention, the method is performed without adding any additional software to the remote computer such that the process is as unobtrusive and/or system independent as possible.

While the method above has been described as a method, performed in a KVM switch or on a computer, the functionality of the method can be implemented in software (either operating at a single location or in a distributed fashion), in hardware (e.g., in an ASIC, FPGA, printed circuit-board), and in a combination of any of the above. In a computer-implemented method, a computer program product includes a computer readable medium with instructions embedded therein for causing a processor (CPU, GPU, DSP or configurable processor), acting as a controller, to perform the method(s) described above. In a hardware-based implementation, a controller circuit coordinates and/or performs the method steps of the present invention.

While the above description has been given with respect to particular examples, one of ordinary skill in the art will appreciate that other variations are possible which would still fall within the scope of the appended claims.

The invention claimed is:

1. A method of detecting a correlation of input device movements, sent from a first location, with at least one configurable position-independent movement parameter set on a remote computer at a second location remote from the first location, the method comprising:

sending first movement information from the first location to the remote computer at the second location, the first movement information corresponding to a first movement of an input device;

tracking, in circuitry at the first location, in response to the remote computer having received the first movement information and utilized the at least one configurable position-independent movement parameter, a resulting movement of a cursor of the remote computer at the second location from a first display location to a second display location;

calculating, in circuitry at the first location, predicted movements of the cursor of the remote computer utilizing at least two possible values for the at least one configurable position-independent movement parameter and the first movement information, wherein a first predicted movement corresponds to an amount of movement of the cursor in response to the first movement information when the at least one configurable position-independent movement parameter is set to a first value, and a second predicted movement corresponds to an amount of movement of the cursor in response to the first movement information when the at least one configurable position-independent movement parameter is set to a second value different than the first value; and determining, in circuitry at the first location, which of the first and second predicted movements most closely matches the resulting movement of the cursor from the first display location to the second display location.

2. The method of detecting as claimed in claim 1, wherein the at least one configurable position-independent movement parameter is an acceleration parameter.

3. The method of detecting as claimed in claim 2, wherein the acceleration parameter comprises a registry entry.

4. The method of detecting as claimed in claim 3, wherein the registry entry is a mouse speed registry entry.

5. The method of detecting as claimed in claim 1, wherein the steps of sending, tracking, calculating and determining are repeated more than once to reduce errors based on unexpected changes in video output of the remote computer.

6. The method of detecting as claimed in claim 1, further comprising determining a shape of a cursor as displayed on the remote computer, wherein the step of tracking the resulting movement comprises tracking a resulting movement of the cursor having the determined shape.

7. The method of detecting as claimed in claim 6, wherein determining the shape of the cursor comprises performing a computer-based pattern matching operation.

8. The method of detecting as claimed in claim 6, wherein determining the shape of the cursor comprises requesting a user to select a cursor shape from a library of cursor shapes.

9. The method of detecting as claimed in claim 1, further comprising applying a compensation to subsequent movement information to cause a local cursor to remain synchronized with a remote cursor of the remote computer which is utilizing the at least one configurable position-independent movement parameter.

10. The method of detecting as claimed in claim 1, wherein the calculating predicted movements utilizing at least two possible values for the at least one configurable position-independent movement parameter comprises displaying to a user cursor positions indicative of the predicted movements when utilizing the at least two possible values for the at least one configurable position-independent movement parameter.

11. The method of detecting as claimed in claim 1, further comprising:

sending second movement information from the first location to the remote computer at the second location, the second movement information corresponding to a second movement of the input device;

tracking a resulting second movement of the cursor of the remote computer at the second location in response to the remote computer having received the second movement information and utilized a second parameter of the at least one configurable position-independent movement parameter;

calculating predicted movements utilizing at least two possible values for the second parameter of the at least one configurable position-independent movement parameter; and determining which of the at least two possible values for the second parameter of the at least one configurable position-independent movement parameter provides the predicted movement most closely matching the resulting second movement of the cursor.

12. A method of detecting a correlation of input device movements, sent from a first location, with at least one configurable position-independent movement parameter set on a remote computer at a second location remote from the first location, the method comprising:

sending first movement information from a keyboard/video/mouse (KVM) switch at the first location to the remote computer at the second location, the first movement information corresponding to a first movement of an input device;

tracking, in the KVM switch at the first location, in response to the remote computer having received the first movement information and utilized the at least one configurable position-independent movement parameter, a resulting movement of a cursor of the remote computer at the second location from a first display location to a second display location;

calculating, in the KVM switch at the first location, predicted movements of the cursor of the remote computer utilizing at least two possible values for the at least one configurable position-independent movement parameter and the first movement information, wherein a first predicted movement corresponds to an amount of movement of the cursor in response to the first movement information when the at least one configurable position-independent movement parameter is set to a first value, and a second predicted movement corresponds to an amount of movement of the cursor in response to the first movement information when the at least one configurable position-independent movement parameter is set to a second value different than the first value; and determining, in the KVM switch at the first location, which of the first and second predicted movements most closely matches the resulting movement of the cursor from the first display location to the second display location.

13. The method of detecting as claimed in claim 12, wherein the step of sending the first movement information comprises:

generating the first movement information internally to the KVM switch without requiring physical movement of the input device.

14. The method of detecting as claimed in claim 12, further comprising:

receiving a command from at least one of a keyboard and a mouse local to a user; and triggering the KVM switch to perform the sending, tracking, calculating and determining steps in response to the received command.

15. The method of detecting as claimed in claim 14, wherein the command comprises a hot-key.

16. The method of detecting as claimed in claim 14, wherein the command is triggered by the selection of a menu item.

17. The method of detecting as claimed in claim 14, wherein the command comprises a predetermined input device movement.

18. The method of detecting as claimed in claim 12, wherein the KVM switch performs the determining step while displaying to a user the video output of a computer other than the remote computer.

19. The method of detecting as claimed in claim 12, wherein the KVM switch performs the determining step while displaying to a user a frozen video image of the remote computer so that movements of the cursor on the remote computer are not seen.

20. A non-transitory computer program product including a computer readable medium with instructions embedded therein for causing a processor to perform the steps of:

sending movement information from circuitry in a first location to a remote computer at a second location, the movement information corresponding to a movement of an input device;

tracking, in the circuitry at the first location, in response to the remote computer having received the movement information and utilized at least one configurable position-independent movement parameter, a resulting movement of a cursor of the remote computer at the second location from a first display location to a second display location;

calculating, in the circuitry at the first location, predicted movements of the cursor of the remote computer utilizing at least two possible values for the at least one configurable position-independent movement parameter and the first movement information, wherein a first predicted movement corresponds to an amount of movement of the cursor in response to the first movement information when the at least one configurable position-independent movement parameter is set to a first value, and a second predicted movement corresponds to an amount of movement of the cursor in response to the first movement information when the at least one configurable position-independent movement parameter is set to a second value different than the first value; and determining, in the circuitry at the first location, which of the first and second predicted movements most closely matches the resulting movement of the cursor from the first display location to the second display location.

21. A keyboard/video/mouse (KVM) switch comprising:

a movement generator for internally generating in circuitry in the KVM switch at a first location first movement information corresponding to a movement of an input device without requiring movement of the input device;

a transmitter, at the first location, for transmitting the first movement information from the first location to the remote computer at the second location;

a memory, at the first location, for storing a resulting movement of a cursor of the remote computer at the second location from a first display location to a second display location in response to the remote computer having received the first movement information and utilized at least one configurable position-independent movement parameter; and a controller, at the first location, for (1) calculating predicted movements of the cursor of the remote computer utilizing at least two possible values for the at least one configurable position-independent movement parameter and the first movement information, wherein a first predicted movement corresponds to an amount of movement of the cursor in response to the first movement information when the at least one configurable position-independent movement parameter is set to a first value, and a second predicted movement corresponds to an amount of movement of the cursor in response to the first movement information when the at least one configurable position-independent movement parameter is set to a second value different than the first value, and (2) determining which of the first and second predicted movements most closely matches the resulting movement of the cursor from the first display location to the second display location.

* * * * *